(12) United States Patent
Kawasaki

(10) Patent No.: US 8,120,366 B2
(45) Date of Patent: Feb. 21, 2012

(54) COLD CATHODE IONIZATION VACUUM GAUGE WITH TRIGGER PLATE

(75) Inventor: Yohsuke Kawasaki, Yamanashi (JP)

(73) Assignee: Canon Anelva Corporation, Kawasaki-shi (JP)

( * ) Notice: Subject to any disclaimer, the term of this patent is extended or adjusted under 35 U.S.C. 154(b) by 268 days.

(21) Appl. No.: 12/470,683

(22) Filed: May 22, 2009

(65) Prior Publication Data
US 2010/0164502 A1 Jul. 1, 2010

(30) Foreign Application Priority Data
Dec. 25, 2008 (JP) ................................. 2008-330217

(51) Int. Cl.
*G01L 21/30* (2006.01)

(52) U.S. Cl. ...................................... 324/460; 324/463

(58) Field of Classification Search .................. None
See application file for complete search history.

(56) References Cited

U.S. PATENT DOCUMENTS 7,456,634 B2 * 11/2008 Knott ............................ 324/460
2009/0199649 A1 8/2009 Kawasaki ....................... 73/755

FOREIGN PATENT DOCUMENTS

| JP | 58-021534 | 2/1983 |
| JP | 06-026967 | 2/1994 |
| JP | 10-019711 | 1/1998 |
| JP | 2008-304360 A | 12/2008 |

* cited by examiner

*Primary Examiner* — Minh N Tang
(74) *Attorney, Agent, or Firm* — Fitzpatrick, Cella, Harper & Scinto

(57) ABSTRACT

To provide a cold cathode ionization vacuum gauge that does not have a complicated structure and can induce discharge in a short time even after the cold cathode ionization vacuum gauge is used for a long time. A cold cathode ionization vacuum gauge has a rod-like anode 2, a measuring element enclosure (cathode) 1 arranged to surround the anode, and a magnet 3 disposed on the outer periphery of the cathode 1. A discharge trigger supporting electrode 5 having a projection 21 directed toward the center axis of the anode 2 is disposed in a discharge space 9 of the cathode 1. The discharge trigger supporting electrode 5 is removably disposed on the cathode 1, and the distance between the tip of the projection 21 of the discharge trigger supporting electrode 5 and the anode 2 is equal to or more than 0.3 mm.

3 Claims, 5 Drawing Sheets

FIG. 8A
FIG. 8B
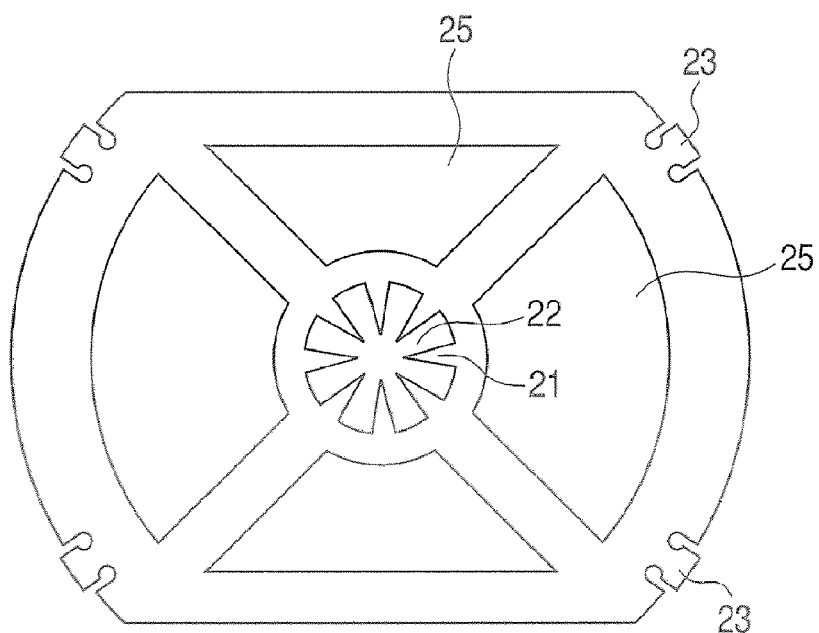

COLD CATHODE IONIZATION VACUUM GAUGE WITH TRIGGER PLATE

CROSS-REFERENCES TO RELATED APPLICATIONS

This application claims the benefit of priority from Japanese Patent Application No. 2008-330217 filed on Dec. 25, 2008, the entire contents of which is incorporated herein by reference.

BACKGROUND OF THE INVENTION

1. Field of the Invention

The present invention relates to a cold cathode ionization vacuum gauge and an auxiliary electrode used therefor. In particular, it relates to a cold cathode ionization vacuum gauge of the inverted magnetron type.

2. Related Background Art

A cold cathode ionization vacuum gauge measures the pressure of a gas by inducing ionization of the gas by self-discharge at the anode and the cathode. Known conventional cold cathode ionization vacuum gauges include the penning type, the magnetron type, and the inverted magnetron type (see Japanese Patent Application Laid-Open No. H10-19711, for example). In particular, the magnetron type and the inverted magnetron type are suitable for measurement of high vacuum because of their high electron trap efficiency and the configuration that allows stable sustained discharge even in a high vacuum area.

In order for a cold cathode ionization vacuum gauge to start discharge, a high voltage needs to be applied to induce ionization. However, a time lag occurs at the boundary between the period in which the high voltage is applied to the cold cathode ionization vacuum gauge and the period in which sustained discharge occurs and a discharge current flows. The time lag affects the time of start of measurement.

As a solution to this problem, Japanese Patent Application Laid-Open No. H6-26967 discloses that discharge inducing means that directly applies a sufficient amount of electromagnetic radiation to cause a cathode to emit photoelectrons is provided on the cathode. Japanese Patent Application Laid-Open No. H6-26967 discloses a cold cathode ionization vacuum gauge of the inverted magnetron type for which the discharge induction time between the application of a high voltage and the start of sustained discharge can be reduced.

SUMMARY OF THE INVENTION

The conventional cold cathode ionization vacuum gauge described in Japanese Patent Application Laid-Open No. H6-26967 has a complicated structure because it has a glow lamp, an ultraviolet irradiation lamp or the like serving as the discharge inducing means and a circuit for driving the same. In addition, since the magnetron type and the inverted magnetron type have high charged particle trapping efficiency, the wall of the vessel of the vacuum gauge is susceptible to sputtering, and thus, the interior of the vessel of the vacuum gauge can be contaminated.

Therefore, as the cold cathode ionization vacuum gauge is used for a long time, a sputtered film is formed on or a product adheres to the surface of the lamp, and ultraviolet radiation is inhibited. Thus, a problem arises that emission of photoelectrons that trigger discharge is reduced, and discharge induction is hard to occur.

Thus, an object of the present invention is to provide a cold cathode ionization vacuum gauge that does not have a complicated structure and can induce discharge in a short time even after the cold cathode ionization vacuum gauge is used for a long time.

The present invention provides a cold cathode ionization vacuum gauge which comprises a rod-like first electrode and a pipe-like second electrode enclosing the first electrode and forming a discharge space between the first electrode and the second electrode, one end of the pipe-like second electrode being configured to be engaged in an airtight manner with a chamber to be measured, the gauge further comprising, a disc-like discharge trigger electrode plate disposed in the discharge space, wherein the rod-like second electrode passes through an aperture formed in the disc-like discharge trigger electrode plate and a plurality of projections which have tips directed toward the rod-like second electrode are provided at the periphery of the aperture.

The present invention provides a disc-like discharge trigger electrode plate used in a cold cathode ionization vacuum gauge which comprises a rod-like first electrode and a pipe-like second electrode enclosing the first electrode and forming a discharge space between the first electrode and the second electrode, one end of the pipe-like second electrode being configured to be engaged in an airtight manner with a chamber to be measured, comprising; a plurality of projections which are projected from a periphery of an aperture formed at a central part of the disc-like discharge trigger plate and have tips.

According to the present invention, complication of the apparatus is avoided, and discharge can be induced in a short time even when a sputtered film is formed on or a product adheres to the interior of the vacuum measuring element as a result of long use of the cold cathode ionization vacuum gauge.

BRIEF DESCRIPTION OF THE DRAWINGS

FIGS. 8A and 8B are a plan view and a side view of a further modification of the discharge trigger supporting electrode plate according to the present invention.

DESCRIPTION OF THE PREFERRED EMBODIMENTS

Figure 1:
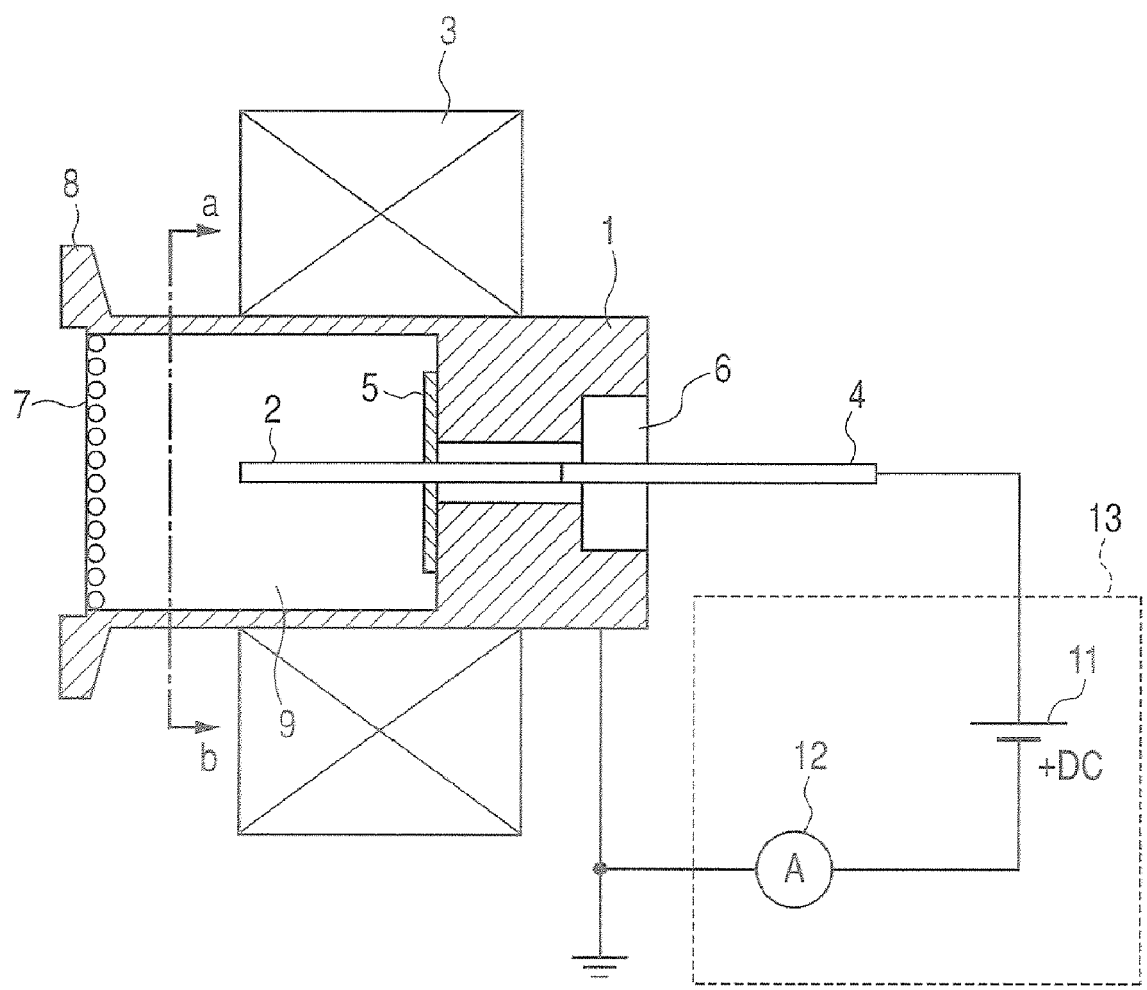
FIG. 1 is a schematic cross-sectional view showing a cold cathode ionization vacuum gauge according to an embodiment of the present invention.

In the following, an embodiment of the present invention will be described with reference to the drawings. FIG. 1 is a schematic cross-sectional view showing a cold cathode ionization vacuum gauge according to an embodiment of the present invention.

The cold cathode ionization vacuum gauge shown in FIG. 1 is a vacuum gauge of the inverted magnetron type and has a measuring element enclosure 1 serving as a cathode and a rod-like anode 2 which is the rod-like first electrode surrounded by a pipe-like discharge space 9 formed therein. On the outside of the measuring element enclosure (cathode) 1 which is the pipe-like second electrode, an annular magnet 3 serving as magnetic means that produces a magnetic field is disposed to surround the measuring element enclosure 1. The magnet is preferably a ferrite magnet.

The anode 2 is connected to a current introducing rod 4 in the measuring element enclosure (cathode) 1. The current introducing rod 4 is connected to a vacuum gauge operating circuit 13 via an insulating stone 6, which is made of alumina ceramic or the like. The vacuum gauge operating circuit 13 has a high voltage power supply 11 that applies a voltage and a discharge current detecting section 12 that measures the discharge current flowing through the vacuum gauge operating circuit 13.

The measuring element enclosure (cathode) 1 has a connection flange 8 and a filter 7 at the side of the opening. The filter 7 is made of stainless steel or the like. The pressure in an object to be measured is measured by attaching the connection flange 8 of the measuring element enclosure 1 to the object to be measured in an air-tight manner. In pressure measurement, the space in the object to be measured can be in communication with the discharge space 9 formed in the measuring element enclosure 1 via the filter 7. In the discharge space 9, a discharge trigger supporting electrode plate 5 is disposed on the bottom thereof, that is, on the surface close to the insulating stone 6. The discharge trigger supporting electrode plate 5 is removably attached to the cathode.

Figure 2:
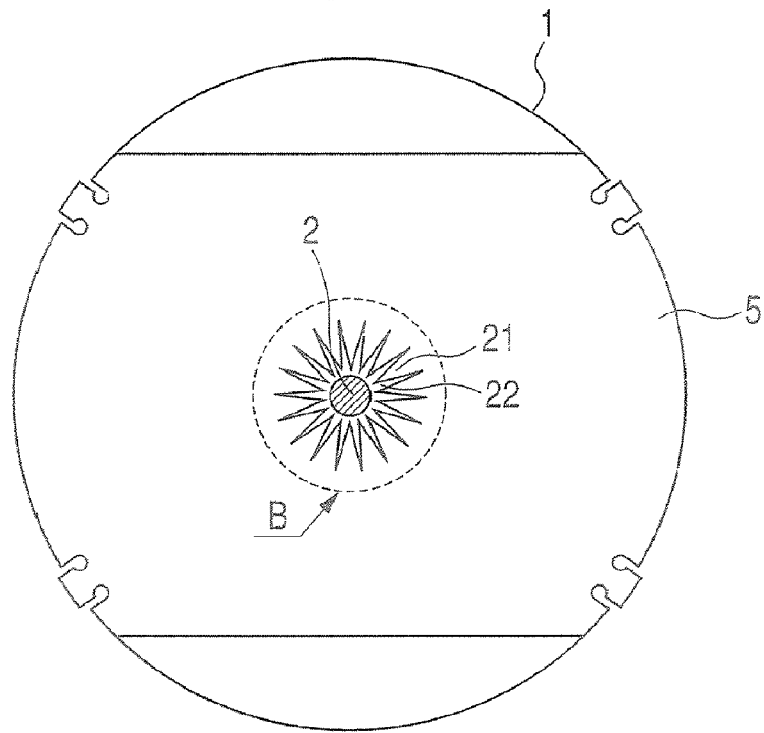
FIG. 2 is a schematic diagram showing attachment of a discharge trigger supporting electrode plate to the cold cathode ionization vacuum gauge shown in FIG. 1.
Figure 3:
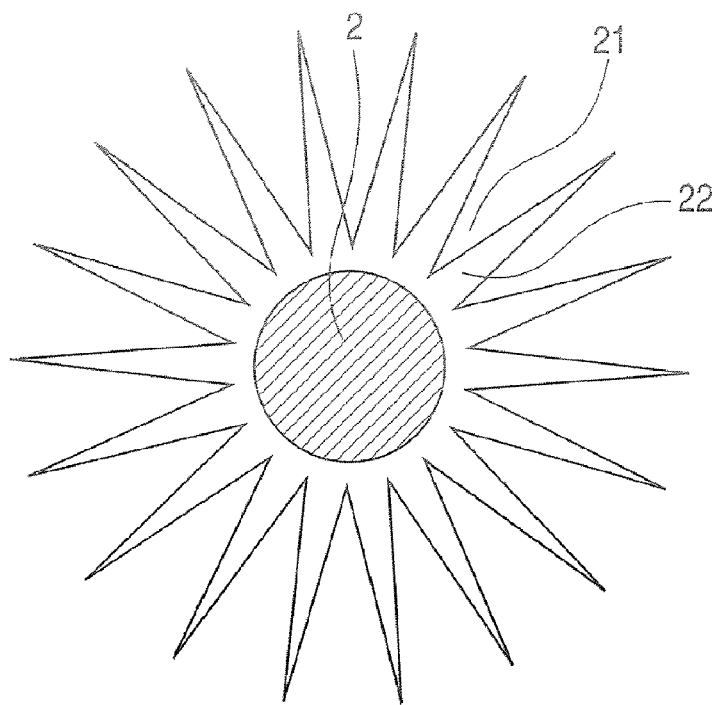
FIG. 3 is an enlarged view of the part B in FIG. 2.

FIG. 2 is a schematic diagram showing attachment of the discharge trigger supporting electrode plate 5 to the cold cathode ionization vacuum gauge, which is a schematic cross-sectional view of the interior of the measuring element enclosure (electrode) 1 of the cold cathode ionization vacuum gauge shown in FIG. 1 taken along the line a-b. FIG. 3 is a schematic enlarged view of the part B in FIG. 2 for illustrating the positional relationship between the discharge trigger supporting electrode plate 5 and the anode 2.

The discharge trigger supporting electrode plate 5 has an aperture 22 at the center thereof, and the aperture has projections 21, each of which has a tip directed toward the center of the anode. The discharge trigger supporting electrode plate 5 is disposed in the measuring element enclosure (cathode) 1 in such a manner that the aperture is out of contact with the anode 2. In order to suppress fluctuations of the discharge current and keep the dark current equal to or lower than a measurement lower limit, the distance between the tip of the projection 21 and the anode 2 is preferably equal to or more than 0.3 mm.

Since the discharge trigger supporting electrode plate 5 having the projections 21 is attached to the measuring element enclosure (cathode) 1, electrons emitted by field emission caused by application of the high voltage to the anode 2 are drawn via the projections 21. That is, the distance between the anode 2 and the cathode 1 is locally reduced by the discharge trigger supporting electrode plate 5. At the same time, since the tips of the projections 21 of the aperture of the discharge trigger supporting electrode plate 5 are more acute than any other parts of the measuring element enclosure (cathode) 1, the threshold of the field emission of electrons is reduced. Unlike the electrons produced by photoelectric effect of a background radiation or the secondary electrons, the electrons are produced when the high voltage is applied to the anode 2. Therefore, the electrons that trigger discharge can be efficiently supplied. Thus, the sustained discharge starting time from the application of the high voltage between the measuring element enclosure (cathode) 1 and the anode 2 can be reduced.

Figure 4A:
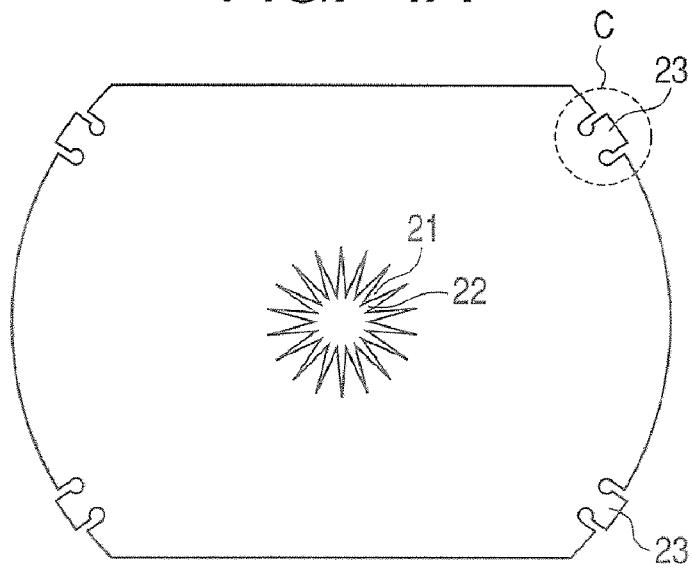
FIGS. 4A and 4B are a plan view and a side view of the discharge trigger supporting electrode plate according to the present invention.
Figure 4B:

FIG. 4A is a plan view of the discharge trigger supporting electrode plate 5, and FIG. 4B is a side view of the discharge trigger supporting electrode plate 5 shown in FIG. 4A.

The discharge trigger supporting electrode plate 5 is formed by a thin plate of a metal having a high corrosion resistance, such as stainless steel, such as SUS304, nickel and a refractory material. The thickness of the discharge trigger supporting electrode plate 5 is preferably 10 μm to 100 μm. The discharge trigger supporting electrode plate 5 has nails 23 for attachment to the measuring element enclosure (electrode) 1. The nails 23 are formed on the outer periphery of the discharge trigger supporting electrode plate 5.

The discharge trigger supporting electrode plate 5 is shaped by photo-etching, pressing, laser beam machining or the like.

Figure 5:
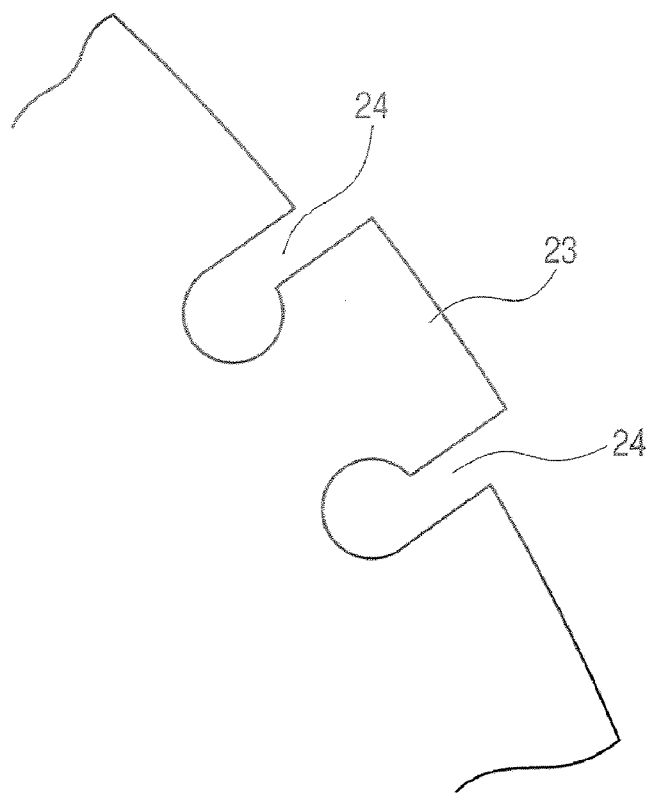
FIG. 5 is an enlarged view of the part C in FIG. 4.

Next, a way of attaching the discharge trigger supporting electrode plate 5 to the interior of the measuring element enclosure (electrode) 1 will be described with reference to FIGS. 1, 2 and 5. FIG. 5 is a schematic enlarged view of the part C in FIG. 4A for illustrating the shape of the nail 23.

The nails 23 are formed on the outer periphery of the discharge trigger supporting electrode plate 5 so as to slightly project beyond the outer periphery. To form the nails 23, notches 24 are formed in the outer periphery on the opposite sides of each nail 23. When the discharge trigger supporting electrode plate 5 is attached to the interior of the measuring element enclosure (electrode) 1, the discharge trigger supporting electrode plate 5 is inserted through the opening of the measuring element enclosure (electrode) 1 from which the filter 7 is removed. In this step, the discharge trigger supporting electrode plate 5 is inserted with the nails 23 bent toward the opening of the measuring element enclosure (electrode) 1.

The discharge trigger supporting electrode plate 5 is inserted to the bottom of the discharge space while the nails 23 pressing the inner wall of the discharge space 9 of the measuring element enclosure (cathode) 1. Since the bent nails 23 act like a plate spring and always press the inner wall of the discharge space 9, the discharge trigger supporting electrode plate 5 is stably fixed in the measuring element enclosure (electrode) 1. The filter 7 is attached at the last.

To remove the discharge trigger supporting electrode plate 5 from the measuring element enclosure (electrode) 1, the nails 23 of the discharge trigger supporting electrode plate 5 are bent inward with a commonly used tool, such as pliers and tweezers.

In this embodiment, the discharge trigger supporting electrode plate 5 is disposed in contact with the bottom of the discharge space 9 in the measuring element enclosure (cathode) 1. However, the discharge trigger supporting electrode plate 5 can be disposed at any location on the wall in the discharge space 9 within the area in which the anode 2 exists.

The cold cathode ionization vacuum gauge according to this embodiment can induce discharge in a short time because the discharge trigger supporting electrode plate 5 having the projections 21 is attached to the cathode. In addition, the discharge trigger supporting electrode plate 5 attached to the cold cathode ionization vacuum gauge can be replaced. Therefore, when the discharge trigger supporting electrode plate is deteriorated, and discharge induction becomes hard to occur, the discharge trigger supporting electrode plate can be replaced with a new one to solve the problem.

Figure 6A:
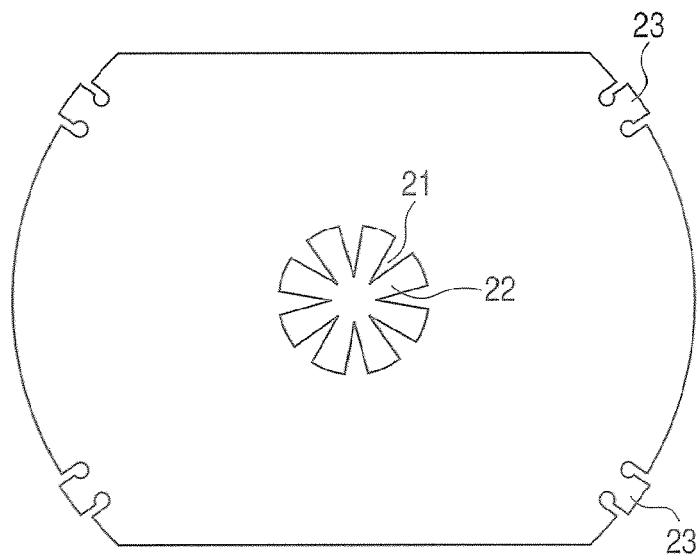
FIGS. 6A and 6B are a plan view and a side view of a modification of the discharge trigger supporting electrode plate according to the present invention.
Figure 6B:
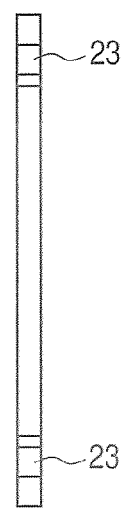

FIG. 6A is a plan view showing a modification of the discharge trigger supporting electrode plate according to the present invention, and FIG. 6B is a side view of the same. In this example, the number of projections of the discharge trigger supporting electrode plate 5 is reduced.

Figure 7A:
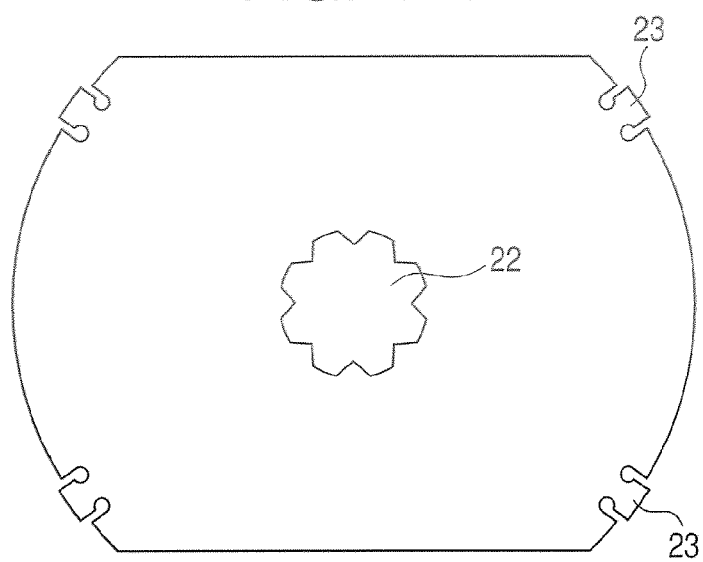
FIGS. 7A and 7B are a plan view and a side view of another modification of the discharge trigger supporting electrode plate according to the present invention.
Figure 7B:
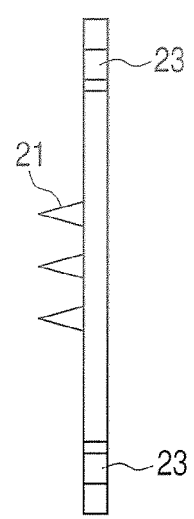

FIG. 7A is a plan view showing another modification of the discharge trigger supporting electrode plate according to the present invention, and FIG. 7B is a side view of the same. In this example, the projections of the discharge trigger supporting electrode plate 5 shown in FIGS. 6A and 6B are raised. In this example, the projections are raised at 90 degrees with respect to the discharge trigger supporting electrode plate positioned at 90 degrees as shown in FIG. 7B. However, as far as the angle of the projections with respect to the discharge trigger supporting electrode plate is equal to or less than 90 degrees, the tips of the projections 21 are directed toward the center of the rod-like anode, and therefore, discharge can be induced from the tips of the projections.

FIG. 8A is a plan view showing a further modification of the discharge trigger supporting electrode plate according to the present invention, and FIG. 8B is a side view of the same. In this example, the discharge, trigger supporting electrode plate shown in FIGS. 6A and 6B further has four apertures 25. The cold cathode ionization vacuum gauge is characterized in that the number of apertures is increased. Therefore, even when the discharge trigger supporting electrode plate is disposed in contact with the bottom of the discharge space in the measuring element enclosure (cathode) of the cold cathode ionization vacuum gauge, gas drawn to the bottom of the discharge space of the cold cathode ionization vacuum gauge after vacuum measurement is started can easily discharged through the apertures.

What is claimed:

1. A cold cathode ionization vacuum gauge comprising a rod-like first electrode and a pipe-like second electrode enclosing the first electrode and forming a discharge space between the first electrode and the second electrode, one end of the pipe-like second electrode being configured to be engaged in an airtight manner with a chamber to be measured, the gauge further comprising,
    a disc-like discharge trigger electrode plate disposed in the discharge space, wherein the rod-like first electrode passes through an aperture formed in the disc-like discharge trigger electrode plate and a plurality of projections which have tips directed toward the rod-like first electrode are provided at the periphery of the aperture,
    wherein the disc-like discharge trigger electrode plate is mounted in the discharge space with at least part of an outer periphery edge of the disc-like discharge trigger electrode plate pressed to the internal wall of the pipe-like second electrode, and
    wherein the disc-like discharge trigger electrode plate has elastic nails which project from the outer periphery of the disc-like discharge trigger electrode plate and the elastic nails are pressed to the internal wall of the pipe-like second electrode so as to mount the discharge trigger electrode plate in the discharge space.

2. The cold cathode ionization vacuum gauge according to claim 1, wherein the disc-like discharge trigger electrode plate comprises a peripheral part, a central part where the aperture is formed and a frame part of coupling the peripheral part to the central part so that the whole of the discharge trigger electrode plate is elastic.

3. A disc-like discharge trigger electrode plate used in a cold cathode ionization vacuum gauge which comprises a rod-like first electrode and a pipe-like second electrode enclosing the first electrode and forming a discharge space between the first electrode and the second electrode, one end of the pipe-like second electrode being configured to be engaged in an airtight manner with a chamber to be measured, comprising:
    a plurality of projections which are projected from a periphery of an aperture formed at a central part of the disc-like discharge trigger plate and have tips,
    wherein the disc-like discharge trigger electrode plate is mounted in the discharge space with at least part of an outer periphery edge of the disc-like discharge trigger electrode plate pressed to the internal wall of the pipe-like second electrode, and
    wherein the disc-like discharge trigger electrode plate has elastic nails which project from the outer periphery of the disc-like discharge trigger electrode plate and the elastic nails are pressed to the internal wall of the pipe-like second electrode so as to mount the discharge trigger electrode plate in the discharge space.

* * * * *